J. D. BELL.
LOCK NUT.
APPLICATION FILED OCT. 5, 1910.
998,151.
Patented July 18, 1911.
2 SHEETS—SHEET 1.
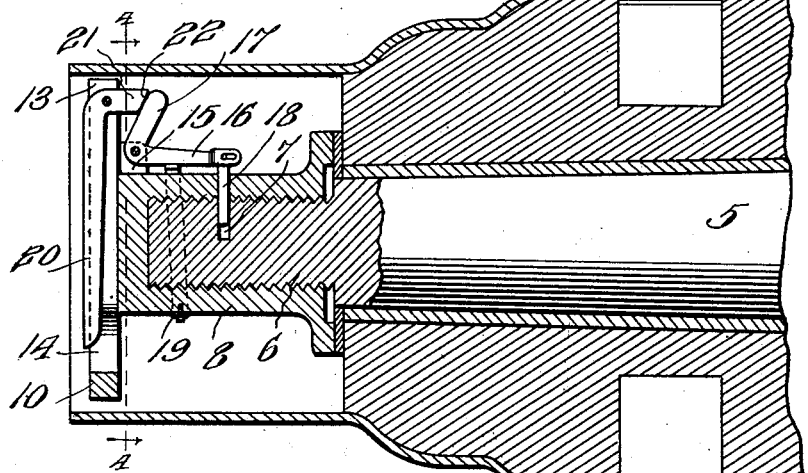
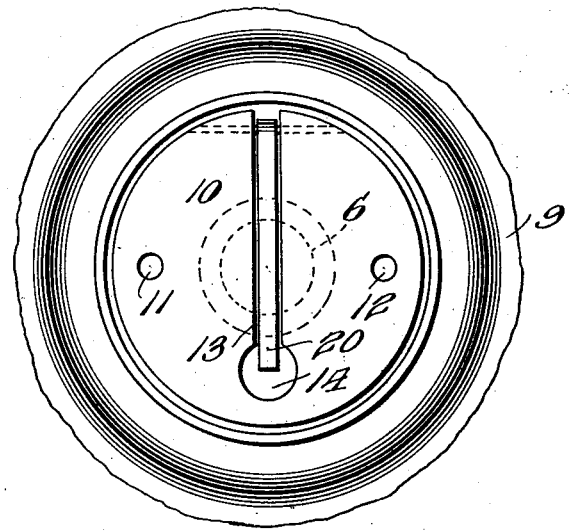
Witnesses
Frank Hough
John A. Dougle
Inventor
James D. Bell,
By Victor J. Evans
Attorney

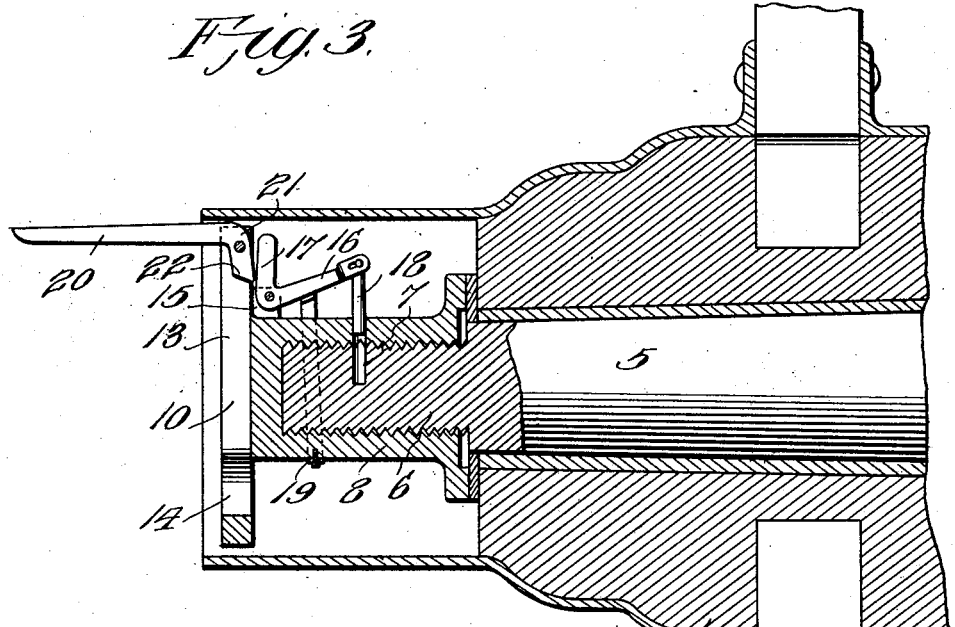
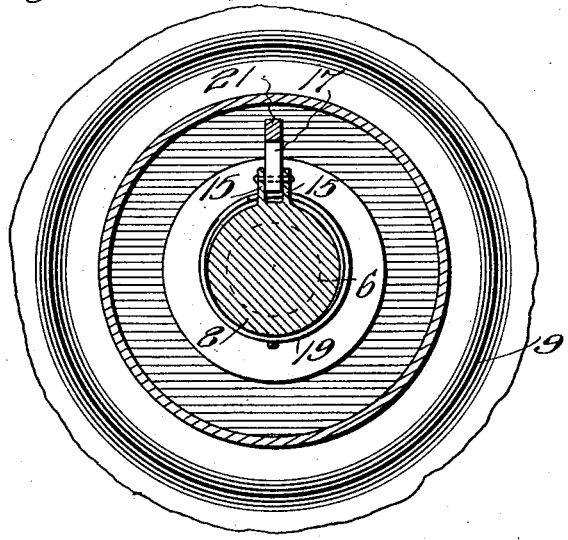

UNITED STATES PATENT OFFICE.

JAMES D. BELL, OF PARIS, KENTUCKY.

LOCK-NUT.

998,151. Specification of Letters Patent. Patented July 18, 1911.

Application filed October 5, 1910. Serial No. 585,490.

*To all whom it may concern:*

Be it known that I, JAMES D. BELL, a citizen of the United States, residing at Paris, in the county of Bourbon and State of Kentucky, have invented new and useful Improvements in Lock-Nuts, of which the following is a specification.

This invention relates to improvements in nut locks, and has particular reference to devices for locking nuts upon the axles of vehicles.

One object of the invention is the provision of a locking attachment which may be readily operated to lock a nut upon the axle of a vehicle without the employment of special tools and after the nut has been locked, the locking member may be manipulated to release the nut when it is desired to remove the vehicle wheel.

Another object is the provision of an attachment which may be applied to most forms of vehicle axles now in use, without necessitating the changing or causing any expensive alterations to the axle.

With these and other objects in view, which will hereinafter fully appear, the present invention consists in certain novel details of construction and arrangement of parts, hereinafter fully described, illustrated in the accompanying drawings and more particularly pointed out in the appended claims, it being understood that various changes in the form, proportion, size and minor details of the device may be made, within the scope of the appended claims, without departing from the spirit or sacrificing any of the advantages of the invention.

In the accompanying drawings, forming a part of the specification:—Figure 1 is a sectional view taken through the portion of a hub, and also showing the spindle partly in section and in elevation and with the device partly in longitudinal section and applied to the end of the spindle or axle. Fig. 2 is an end view. Fig. 3 is a view similar to Fig. 1, but showing the parts in unlocked position. Fig. 4 is a sectional end view on the line 4—4 of Fig. 1 and looking in the direction of the arrows.

Similar numerals of reference are employed to designate corresponding parts throughout.

The spindle is designated by the numeral 5 and terminates at one end in the usual exteriorly threaded boss 6. Extending inwardly from the intermediate portion of the boss is a radial opening 7, the function of which will appear later.

The nut forming one part of the subject matter of the present invention includes in its construction an internally threaded tubular portion 8 of a diameter to receive the threaded boss 6. Formed in the wall of the nut is an opening which, when the nut has been screwed into the boss sufficiently far to prevent lateral movement of the hub 9, will aline with the opening 7 in the boss 6. The outer end of the tubular portion 8 is provided with an enlarged circular head 10, the latter having oppositely positioned openings 11 and 12 which receive the terminals of a tool, by means of which the nut is screwed onto and off the boss 6. Extending throughout the major portion of the head 10 is a transverse slot 13, the inner end of which terminates in a semi-circular enlargement 14.

Formed on the outer face of the tubular portion 8 and in alinement with the outer end portion of the slot 13, are a pair of lugs, one of which is shown and designated by the numeral 15. Pivoted between these lugs is an angular shaped arm, the sides of which are designated by the numerals 16 and 17. The longer of these sides, 16, extends in the direction of the length of the tubular portion 8 and terminates at the transverse opening formed in the said tubular member. Slidingly fitted in the transverse opening of the tubular member 8 is a locking bolt 18 somewhat greater in length than the distance between the inner end of the opening 7 of the boss 6 and the outer surface of the tubular member 8. The outer end of the bolt 18 is pivoted to the extremity of the arm 16, as shown in the drawings. The angular arm is secured at the juncture of its sides 16 and 17, and the shorter of the said sides inclines upwardly and away from the adjacent surface of the circular head 10.

Encircling the tubular member 8 is a circular shaped spring designated by the numeral 19. This member is formed of a single band of resilient metal, and at its middle portion is fixedly secured to the outer surface of the tubular portion 8. The extremities of the spring 19 extend through the space between the side 16 of the angular shaped arm and adjacent the surface of the tubular member 8, and since the spring is considerably greater in diameter than the diameter of the tubular member 8, the tendency of the extremities of the arms will be to move upwardly and outwardly, thus bearing on the horizontal side portion 16 and moving the same upwardly with the locking bolt 18 and normally tending to force the locking bolt out of the opening in the boss.

In order that the locking bolt may be held within the opening of the boss against the action of the spring 19, what will subsequently be termed a keeper is employed. This member includes an elongated side portion 20 terminating at one end in a side portion 21 arranged at substantially right angles to the side 20, and the extremity of which is beveled as shown at 22. The keeper is pivoted in the recess 13 and adjacent to the outer end thereof, the pivot pin passing through a point adjacent to the juncture between the sides 20 and 21. It might here be stated that the length of the longer side 20 is a trifle less than the length of the socket 13, and the keeper is so positioned that the shorter side 21 will extend through the recess and its beveled surface 22 bear on the adjacent surface of the side 17 of the angular arm.

When it is remembered that the length of the shorter side 21 of the keeper is considerably less than the distance between the surface of the tubular portion 8 and outer end of the recess 13, it will be evident when the keeper is turned, by moving the side 20 outwardly and away from the circular head 10, that the shorter side 21 will extend downward and in the plane of the inner face of the circular head 10. When the parts are in this position the side 16 of the angular shaped arm will be moved upwardly by the action of the spring 19 whereupon the locking bolt will be disengaged from the opening in the boss. When, however, the longer side 20 of the keeper extends vertically downward, the shorter side will project inwardly and bear on the side 17 of the arm, whereupon movement of the locking bolt will be positively prevented. By virtue of the semi-circular extension of the recess 13 an opening will be presented for the thumb and forefinger of the operator when it is desired to raise the keeper.

From the foregoing it will be seen that I have provided a device which is comparatively simple in construction, inexpensive to manufacture, embodying few parts, and these so arranged that the danger of derangement will be reduced to a minimum.

Having thus described the invention what I claim as new, is:—

1. In a nut lock the combination with a screw threaded member provided with a transverse opening, and a nut to receive the said member having a transverse opening to aline with the opening of the member; of an arm pivoted to the nut and having a locking bolt to pass through the transverse openings of the member and nut, and a movable keeper carried by the nut adapted to engage with the arm to prevent movement of the latter and locking bolt.

2. In a nut lock the combination with a screw threaded member provided with a transverse opening, and a nut to receive the said member having a transverse opening to aline with the opening of the member; of an angular arm pivoted to the nut, a locking bolt pivoted to the extremity of one side of the arm and receivable by the alining openings of the member and nut, a spring embracing the nut and operating to move the locking bolt upwardly and out of the recess of the screw threaded member, and a keeper carried by the nut to engage with the opposite side of the arm and serving to hold the locking bolt in the recess of the threaded member against action of the spring.

In testimony whereof I affix my signature in presence of two witnesses.

JAMES D. BELL.

Witnesses:
  A. EVANS,
  W. T. BRYAN.

---

Copies of this patent may be obtained for five cents each, by addressing the "Commissioner of Patents, Washington, D. C."